Jan. 10, 1956 H. B. SEDGFIELD ET AL 2,730,573

FEED-BACK AMPLIFIER SYSTEMS AND SERVO MECHANISMS THAT ARE ADAPTED TO RESPOND TO INPUT CHANGES AT VERY LOW FREQUENCIES

Filed Nov. 30, 1949 2 Sheets-Sheet 1

Inventors
HUGH BROUGHAM SEDGFIED
FREDERICK ARTHUR SUMMERLIN

By Herbert H. Thompson
their Attorney.

Jan. 10, 1956 H. B. SEDGFIELD ET AL 2,730,573

FEED-BACK AMPLIFIER SYSTEMS AND SERVO MECHANISMS THAT ARE ADAPTED TO RESPOND TO INPUT CHANGES AT VERY LOW FREQUENCIES

Filed Nov. 30, 1949 2 Sheets-Sheet 2

Inventors
HUGH BROUGHAM SEDGFIELD
FREDERICK ARTHUR SUMMERLIN

By Herbert H. Thompson
their Attorney.

1

2,730,573

FEED-BACK AMPLIFIER SYSTEMS AND SERVO MECHANISMS THAT ARE ADAPTED TO RESPOND TO INPUT CHANGES AT VERY LOW FREQUENCIES

Hugh Brougham Sedgfield, Barnes Common, London, and Frederick Arthur Summerlin, Lee, London, England, assignors, by mesne assignments, to The Sperry Gyroscope Company, Limited, Brentford, England, a company of Great Britain Application November 30, 1949, Serial No. 130,328
Claims priority, application Great Britain December 1, 1948
4 Claims. (Cl. 179—171)

This invention relates to negative feed-back amplifier systems or servo-mechanisms and particularly to negative feed-back amplifier systems or servo-mechanisms adapted to respond to primary signal inputs that undergo changes at very low frequencies. An electron-discharge-tube amplifier of the kind generally known as a D. C. amplifier, if it incorporates a negative feed-back connection, is a particular case of an amplifier system of the kind specified.

In this specification the term "negative feed-back amplifier system" is used to denote any electrical amplifier circuit or system or electrical servo-mechanism that comprises, on the one hand, an electrical or electro-mechanical power amplifier arranged to receive a power input from a source of power, and an input control voltage or current, and to convert a variable proportion of the power received from the source of power into an output quantity applied in or to an output circuit or load, in such a way as to make this output quantity a function, or time function, of the input control voltage or current; and, on the other hand, a combining circuit or device that is arranged to receive two inputs, one a primary signal input, in dependence on which the output quantity is to be controlled, and the other a fed-back quantity that is a function, or time-function, of the output quantity of the power amplifier, and which is adapted to supply to the power amplifier the input voltage or current to the latter, providing this as a function, or time function, of its own two inputs. Furthermore, the term "negative feed-back amplifier system" is to be understood as referring to such a system in which the feed-back is negative or degenerative, and is quantitatively significant. By this is meant, that the system is stable when operative, i. e. it does not break into self-sustained oscillations by virtue of the power fed back from the output circuit into the input of the power amplifier, and also is such that, for at least some primary signals, the feed-back quantity is of the same order or magnitude as the primary signal, and then operates in the combining device or circuit to render the input voltage or current to the power amplifier significantly smaller than it would be if the same primary control signal were operative alone without degeneration by the fed-back quantity. In consequence it will also render the output quantity from the power amplifier smaller than it would be if the primary control signal were operative alone.

In most feed-back amplifier systems the combining device is an electric circuit to which the primary signal is applied as a primary signal voltage or current, and to which the fed-back quantity is also applied as a voltage or current, and the combining circuit operates to provide to the power amplifier an input voltage that is proportional to the algebraic sum or difference of its two input voltages or currents. In some cases, however, the combining device is of a more complicated nature, and the input that it applies to the power amplifier is a more complicated function of its own two inputs. In such cases one may, as a matter of convenience, consider as the primary signal, not the actual primary signal that is applied to the primary-signal input arrangements of the combining device, but that fictitious or ideal voltage or current which the combining circuit or device would apply as an input to the power amplifier if it were to receive, in its primary-signal input arrangements, an input quantity equal to the actual primary-signal, while not receiving any fed-back input quantity in the input arrangements of the combining device for the latter quantity, and one may consider as the feed-back quantity, not the actual feed-back quantity that is applied to the combining device in the input arrangements for that quantity, but that fictitious or ideal feed-back voltage or current which the combining circuit or device would apply as an input to the power amplifier if it were to receive in its input arrangements for the feed-back quantity a quantity equal to the actual feed-back quantity, while not receiving any primary signal input.

What is thus considered as the ideal primary signal voltage or current, and what is thus considered as the ideal feed-back voltage or current, may not, with some kinds of combining device or circuit, exist separately and simultaneously as physical quantities in any part of the combining device or circuit when the latter is supplied with both the primary signal and the corresponding fed-back quantity. However, as a matter of convenience, the operation of the system may then be considered to be as if the ideal primary signal voltage or current and the ideal feed-back voltage or current were being applied as inputs to an ideal combining circuit that is adapted to derive from those ideal signals a combined input identical with that which is in fact applied to the amplifier by the actual combining device in response to the actual primary signal and the actual fed-back signal applied to the combining device.

From this point of view every feed-back amplifier system may be regarded as a feed-back amplifier having an actual or ideal combining circuit that is adapted to combine a primary signal voltage or current with a fed-back voltage or current to provide a resultant voltage or current which constitutes the input to the power amplifier.

The zeros of measurement for the primary signal, the fed-back signal, and the resultant input voltage to the power amplifier may be so chosen in relation to each other that, when the first two are zero, the third is also zero, and it is assumed hereinafter that they have been so chosen. The invention is concerned only with systems in which the resultant input voltage to the power amplifier changes sign whenever either the primary signal voltage or the fed-back voltage changes sign while the other remains at zero. Therefore, to a first approximation holding good for sufficiently small values of the primary signal voltage, the input voltage to the power amplifier may be considered to be a linear function of the primary signal and the fed-back quantity. Since the input signal derived from the combining device is smaller than that which would be due to the primary signal alone, it is convenient to measure the primary signal and the fed-back quantity in such senses that the resultant input signal is, to a first approximation for small values of the signals, the algebraic difference between the (ideal) primary signal and the (ideal) fed-back quantity.

As has been stated, the invention is concerned particularly with negative-feed-back amplifier systems capable of operating satisfactorily in response to primary signals that are liable to undergo changes at extremely low frequencies, e. g., systems that are, or that incorporate, so-called D. C. amplifiers, i. e., valve amplifiers in which the valve circuits are intercoupled by circuit elements all of which conduct direct currents.

A difficulty that arises in connection with all amplifiers and servo mechanisms that are responsive to input changes of very low frequency, or of very long time-constant, such as D. C. vacuum-tube amplifiers, is that they are responsive to undesired slow changes of current or voltage developed accidentally in the circuits of the amplifier or servo mechanism. For example, they may respond to changes of voltage in some part of a circuit due to variations in a supply voltage, or due to slow variations in the magnitude of some value measuring a quantitative electrical property of an electric circuit component, e. g. the conductance of an electron-discharge tube in the amplifier (which variations may, for example, in turn be due to temperature changes). Changes of these kinds are referred to as drift effects.

Since an amplifier or servo-mechanism of the kind under consideration is, by hypothesis, designed to respond to input signals having very low rates of variation, it responds to drift voltages generated in the amplifier circuits just as if these were signal voltages, thus causing changes in the output of the amplifier, even although there may have been no change in the primary signal input. Very great errors in the operation of the system may thus be caused particularly as a result of the occurrence of drift effects in the first stage of the amplifier. Output voltages from an amplifier due to drift effects are referred to as drift voltages.

In negative feed-back systems of the kind specified any output due to drift effects results in the application of a feed-back voltage into the input of the amplifier system, where it operates to degenerate the drift effects. In the steady state attained by such an amplifier system in the absence of a primary signal input from an external source, the system is found to have both an output due to drift effects and an input voltage or current applied by the feed-back connection. The output due to drift is much smaller than it would have been in the absence of the negative-feed-back connection. However, this fact does not mean that drift effects are any less important in negative feed-back amplifier systems than in straight amplifier systems without negative feed-back, since the negative feed-back degenerates not only the component of the output that is due to drift but also the component of the output that is due to the primary signal. The component of the output of the system due to drift is therefore as important, relaitvely to the component of the output due to to a primary signal input, in the case of a negative feed-back amplifier as it is in a straight amplifier without feed-back.

The fact that difficulties of this kind arise in the use of amplifier systems responsive to primary signals of very low frequency owing to drift effects is well known in connection with one class of these systems, namely, in connection with vacuum-tube amplifiers of the so-called D. C. type that provide a steady output voltage or current whose value depends on the value of a steady input voltage or current. In fact, the liability of D. C. amplifiers, whether or not of the negative-feed-back kind, to develop relatively large errors due to drift effects has hitherto militated against the use of such amplifiers in servo-mechanisms and control systems generally, and has led to a very general preference for the use of A. C. amplifier systems, i. e., systems in which at least the resultant control signal applied to the power amplifier by the combining device or circuit, and, in most cases also, both the primary signal and the feed-back quantity, are in the form of a modulation imposed on a carrier wave, the modulation representing the control signal. The power amplifier used in such an A. C. signal system can be one that does not pass D. C. signals and is therefore free from drift effects. These A. C. signal systems, or modulated-carrier-wave systems, are usually preferred for this reason in spite of the greater simplicity of D. C. circuits, and in spite of the lower cost, and smaller size and weight, of the circuit components used in D. C. amplifiers.

The chief object of the present invention is to provide a negative feed-back amplifier system that is operative at extremely low frequencies, e. g., a D. C. system that will provide a steady output dependent on the value of a steady input, and yet is sensibly free from drift disturbances and errors. Another object is to provide an auxiliary compensating amplifier arrangement capable of being connected to a negative feed-back amplifier system having a main-channel power-amplifier subject to drift effects originating in it, the auxiliary amplifier arrangement being operative when so connected, to compensate the main-channel amplifier for drift, so as to make the overall performance of the system substantially free from disturbances and errors due to drift. Another object is to provide drift-compensating apparatus comprising a single compensating amplifier, and arrangements for rendering it effective to compensate a plurality of negative-feed-back amplifier systems against drift effects. Another object is to provide a substantially drift-free D. C. amplifier capable of continuous operation.

The invention is most easily explained in terms that are perhaps more commonly used in the art of servo mechanisms than in the art of electronic feed-back amplifiers. Since a negative feed-back amplifier system derives from the primary signal input and the feed-back quantity, by means of the combining device or circuit, a resultant quantity for application to the power amplifier, which is much smaller than if either the primary signal or the feed-back quantity were applied alone, the system as a whole may be regarded as one that operates to maintain the feed-back quantity substantially matched to, and opposed to, the primary-signal input, and the combining device or circuit may be regarded as producing, as its output, a signal that measures the error in matching; this matching error is the quantity that is passed to the power amplifier to constitute its resultant input voltage. It is convenient to refer to this input to the power amplifier as the error signal, in order to distinguish it from the primary signal that is applied as an input to the combining device or circuit, and from the feed-back quantity.

It is to be noted that the feed-back quantity is derived from the error signal by means of a loop circuit consisting of a forward branch—the power amplifier—and of a return branch—the feed-back connection—the one making the output of the system a function of the error signal and the other making the feed-back quantity a function of the output quantity, and hence of the error signal.

The ratio of the feed-back quantity to the error-signal is called the gain round the loop, and this, though smaller than the gain of the power amplifier per se, is in general large, because the error signal is generally small compared with the feed-back quantity. In general, an increase in the gain round the loop results in a decrease in the matching error, always provided that the amplifier system remains stable. In practice, it is often difficult to alter a negative feed-back amplifier system to increase the gain round its amplifying and feed-back loop without rendering the system as a whole unstable at some frequency, so that it bursts into oscillation at that frequency. If instability does not set in, an increase of gain round the loop improves the matching between the feed-back quantity and the control-signal input and therefore decreases the error signal.

According to a feature of the present invention there is provided a negative feed-back amplifier system substantially free from drift errors, though its main-channel power amplifier, from whose output the feed-back quantity is derived, may be inherently subject to drift errors, wherein the error-signal provided by the combining device in simultaneous response to the primary signal input and to the feed-back quantity is applied to the main-channel amplifier indirectly through a drift-compensating device comprising a drift-compensating amplifier that is itself either inherently free from, or is compensated for, drift effects originating in it, and a circuit that operates to add the output of the compensating amplifier (which is an amplified version of the error signal) to the error signal and to apply the resultant of error signal and compensating-amplifier output to the main-channel power amplifier to constitute its input.

A form of the invention may be regarded according to another point of view which constitutes another aspect of the invention. According to this point of view the invention provides a negative-feed-back amplifier system in which the error-signal is applied as an electrical voltage or current input to a complex electrical amplifier comprising two amplifiers connected in cascade, the first (the compensating amplifier) being one that is inherently free from drift effects, or is self-compensating for drift effects, and the second being one which may be subject to drift effects, and in which the error signal is also fed forward past the first amplifier to be applied as an input to the second in addition to the output from the first amplifier. The output of the second amplifier constitutes the output of the system that is to be a function, or time function, of the primary signal, and the feed-back signal is derived from this output.

In a system incorporating a compensating device according to the invention the gain round the loop constituted by the two amplifiers and the feed-back connection is greater than the gain that would be obtained by the system if the compensating device were not in operation. The result is that the system operates to make the feed-back quantity match the control-signal input more closely, so that the error signal is rendered much smaller than if the compensating device were not in operation. In particular, drift-error inputs that would arise in the main-channel amplifier if the compensating device were not present, as a result of feed-back of the component of the output due to drift effects, are decreased owing to the presence of the compensating device by a factor equal to the amplification factor of the compensating device (the effective amplification factor for "zero-frequency" inputs). It follows that the error outputs due to drift effects are decreased by the action of the compensating amplifier in this same ratio, because the error-input signal due to drift is derived from the error output due to drift by the same feed-back circuit whether the compensating amplifier is present or not. It is to be noted, however, that the insertion, according to the invention, of the compensating amplifier between the combining device and the input to the main-channel amplifier has little, and generally negligible, effect on the effective overall amplification of the system, considered as the ratio of output to primary signal input. It merely makes the feed-back signal more nearly equal to the control signal, and therefore makes the overall amplification more nearly equal to the reciprocal of the feed-back attenuation factor.

The compensating amplifier may be arranged to receive as its input the error signal directly provided by the combining device, in which case it is preferably an amplifier of high amplification factor. Alternatively, it may be connected to receive as its input the same input that is applied to the main-channel amplifier, that is, the output of the circuit that operates to add the output of the compensating amplifier to the error signal. Thus, in this latter case, the input to the compensating amplifier consists of its own output added to the error signal. In other words, the amplifier operates as a regenerative amplifier, the input to which is an error signal. In this last-mentioned form of the invention, the amplifier should be one having a low amplification factor, in the neighbourhood of unity or less, in order that, when connected regeneratively as described, it does not render the whole system unstable.

The compensating amplifier may include filter circuits, such as smoothing or storing circuits, preferably in the output circuit of the amplifier, so that the amplified error signal provided by the compensating amplifier may be modified, e. g. smoothed, by the filter circuit before it is added to the error signal to constitute the input to the main-channel amplifier. In this way the gain round the loop, which is increased by the addition of the compensating amplifier, may be reduced again over certain frequency bands, e. g., for all frequencies above a given frequency, to avoid the instability that might otherwise result in those frequency bands if the gain round the loop were increased in those frequency bands also. The overall characteristic of the compensating amplifier and the filter circuit must show a high amplification at extremely low frequencies, such as those that occur in drift effects, in order to achieve the result aimed at by the invention. Apart from that, the frequency characteristics of the filter circuit are relatively unimportant, in the sense that they do not appreciably affect the ratio of output quantity to primary signal input, since this ratio is substantially completely determined by the feed-back attenuation factor, and is substantially independent of the frequency characteristic of the filter circuit used in the compensating amplifier. This fact enables the filter circuit to be designed solely with an eye to securing stability of the system.

According to a further feature of the invention, the compensating amplifier may be one that operates intermittently; for example, it may be a "chopper-amplifier" that converts input direct voltages or currents to modulated alternating voltages or currents at some fixed carrier frequency, amplifies these as alternating quantities, and converts the amplified version of these voltages or currents so obtained into corresponding direct quantities in a rectifying and smoothing circuit. In compensating amplifiers of this "chopper" type the smoothing circuit will be subject to the considerations already discussed for filter circuits generally.

The compensating amplifier may be purely electrical; for example it may be one in which the amplifying element or elements is an electron-discharge tube or set of electron discharge tubes connected in cascade. Alternatively it may be an electromechanical amplifier, i. e., it may include a motor device whose movements alter the constants of an electric circuit to produce an output therefrom for compensating the main channel amplifier.

The compensating amplifier may also be a D. C. amplifier that is only intermittently rendered operative to compensate the main-channel amplifier and that is rendered automatically self-compensating for its own drift effects in the intervals between its operating periods. In that case, provision is made that the output of the compensating amplifier shall be developed only slowly in response to the instantaneous input to the compensating amplifier, and shall be stored for application in the intervals between its operating periods as a continuous drift-compensating correction to the input of the main-channel amplifier. For example, the input circuit of the compensating amplifier may be intermittently switched at regularly recurring time intervals to receive the error signal voltage as an input, and its output circuit, in which an amplified version of this voltage is then developed, may be intermittently switched to apply this voltage to charge a condenser connected permanently in series with the error-signal in the input circuit of the main-channel amplifier. The stored charge on the condenser is then effective to apply a steady voltage in the input circuit of the main-channel amplifier between the successive periods in which the compensating amplifier is switched into operation. The storage condenser and the circuit from which it is charged constitute a smoothing circuit.

One and the same compensating amplifier may be arranged to compensate a plurality of feed-back amplifier systems against drift errors by connecting it cyclically for suitable time intervals to receive in spaced succession the several inputs to the several main-channel amplifiers, and by simultaneously connecting it to apply its corresponding outputs to storing arrangements in the compensating circuits of the several main-channel amplifiers, each of these storing arrangements serving to store the compensating quantity that the compensating amplifier applies to it when it is connected to that storing arrangement, and to apply to the main-channel amplifier substantially that compensating quantity in the intervals between such connection.

The above and other features of the invention will become clearer from the following description of preferred embodiments of the invention, which are described in relation to the accompanying drawings, of which:

Figure 3:
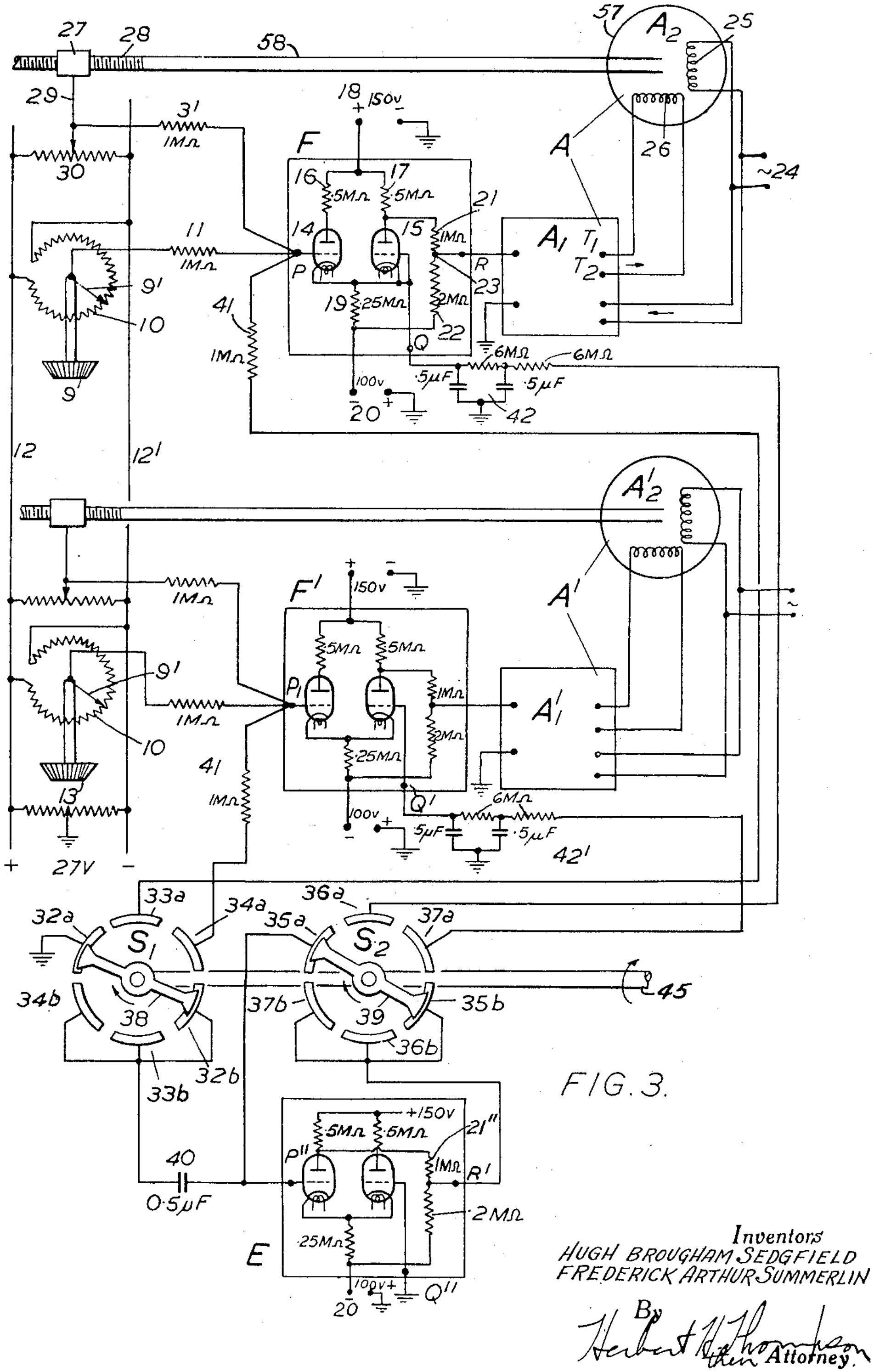

Fig. 3 is a schematic circuit diagram of a form of the present invention applied to a servo-mechanism suitable for use in a control system for aircraft, comprising a main-channel amplifier and a drift-compensating amplifier, and in which the primary control signals are D. C. voltages, the compensating amplifier being common to two such servo-mechanisms, and being arranged to compensate intermittently in succession the drift effects that occur in the two main-channel amplifiers of these servo-mechanisms.

Figure 4:
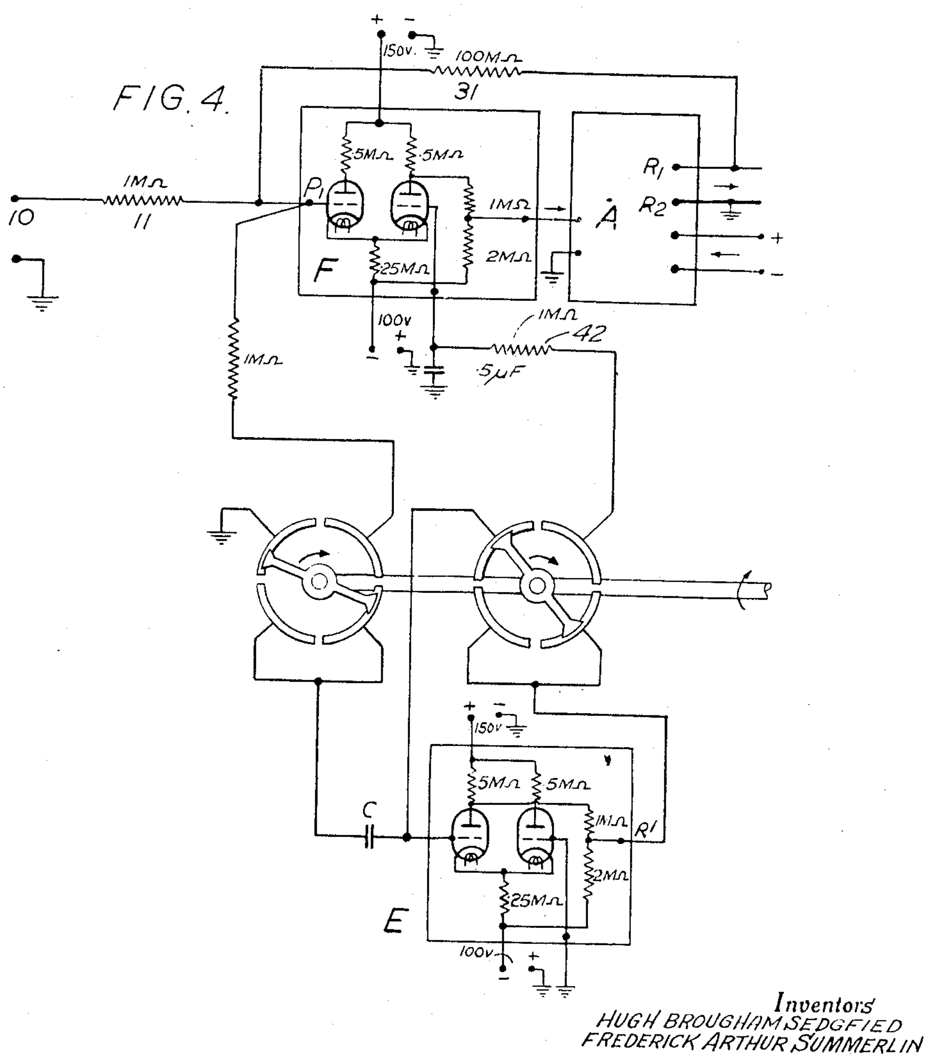

Fig. 4 is a schematic circuit diagram of the present invention applied to a negative-feed-back vacuum-tube amplifier suitable for use in operating a recorder of variable D. C. input voltages.

Figure 1:
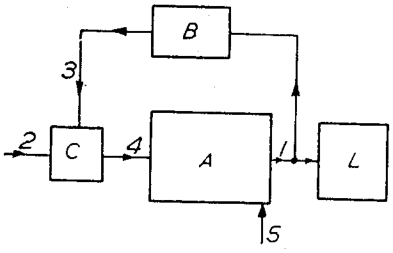
Fig. 1 is a block diagram of a negative-feed-back amplifier system.

In Fig. 1, A is a power amplifier intended to apply to a load L an output quantity 1 variable in dependence on a primary input signal 2. For this purpose the primary signal 2 is applied to the power amplifier A through a differential combining device C, which also receives a fed-back quantity 3 derived from a feed-back circuit B. The differential combining device C provides an output voltage 4 which is applied as the control input to the power amplifier A. The power amplifier A also receives a power input 5 from a source of power; part of this power is applied by the amplifier to provide the output quantity 1 imparted to the load L, and the amount so applied is controlled in accordance with the control voltage 4 to be a function, or time function, of the control voltage 4. The output quantity 1 is also applied to the feed-back circuit B, which operates to make the fed-back quantity 3 a function, or time function, of the output quantity 1.

The basic diagram of Fig. 1 applies equally to a negative feed-back vacuum-tube amplifier and to a servo mechanism, the essential difference being that in the former the amplifier A consists solely of electric circuits, whereas in a servo mechanism the power amplifier A includes an electro-mechanical device providing a mechanical output, which may be the final output quantity 1 applied to the load, or may control the provision of the quantity 1 through a stage of power amplification. A system of this kind, if it is stable, operates to control the output quantity 1 to be such that the feed-back quantity 3 opposes the primary signal 2 in the combining device or comparator C to such an extent as to render the output signal 4 from the combining device much smaller than it would be for the same primary signal 2 if there were no feed-back of the quantity 3. The output quantity 4 from the differential combining device C is referred to in servo-mechanism theory as "the error-signal," because it measures the error in matching of the primary signal 2 by the feed-back quantity 3. This term will therefore be used for the quantity 4 in the following descriptions of embodiments of the invention. When correct matching is obtained, the error signal will be zero.

The invention is concerned with systems of the kind specified in which the amplifier A responds to extremely slow variations of the error signal 4, and, in particular, with so-called D. C. systems of this kind, i. e. systems in which there is produced, corresponding to a steady error signal 4, a steady output quantity from the amplifier, whose value depends on the value of the error signal input. Such D. C. systems are liable to drift-errors, as a result of which the amplifier A may produce an output 1 even although the error signal 4 is zero. When drift effects develop in a system of the kind illustrated, the system settles down to a steady state in which, if the primary signal 2 is zero, there will be a drift-error signal input 4 and a drift-error output quantity both different from zero, the former being maintained from the latter by means of the feed-back circuit B and the differential combining-device C. The input drift-voltage 4 so developed operates to keep the output drift-voltage 1 much smaller than it would be if there were no degenerative feed-back, but the drift voltage output is still not negligible relative to any signal output that may be present, and it produces serious errors in the operation of such systems.

Figure 2:
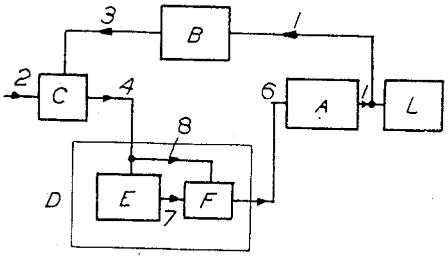
Fig. 2 is a block diagram of a negative-feed-back amplifier system acocrding to the present invention.

Fig. 2 illustrates a control system in accordance with the invention, which differs from the known system of Fig. 1 by employing a compensating device D interposed between the differential combining device C and the power amplifier A. The error signal 4 produced by the combining device C in response to the primary signal 2 and the feed-back quantity 3 is applied as an input to the compensating device D, and the output 6 of the latter is applied as an input to the power amplifier A.

The compensating device D comprises a compensating or drift free amplifier E and a combining device F. The compensating amplifier E receives the resultant signal 4 as an input and applies its output 7 to the combining device F. The error signal 4 is also fed forward past the amplifier E in a circuit 8 to the combining device F, and is added to the signal 7 in the combining device to produce the signal 6 that constitutes the input to amplifier A. The input 6 to amplifier A is much greater for the same error signal 4 than if amplifier E were not operating. It therefore follows that in the position of rest the error signal will be smaller than if amplifier E were not included in the system. In particular, errors due to drift effects occurring in the amplifier A will be smaller because they will be self-degenerated to a greater extent owing to the greater gain round the amplifying and feed-back loop when amplifier E is operating. In fact, to a close approximation, the error due to drift in the amplifier A is reduced, by use of amplifier E, by a factor equal to the amplification factor of amplifier E.

Fig. 3 illustrates a practical form of the invention, in which one and the same compensating amplifier, corresponding to the amplifier E of Fig. 2, is applied to compensate drift-effects occurring in the main-channel power amplifier of two separate servo-mechanisms. The two servo-mechanisms shown are identical and it will suffice to describe the operation of the invention in connection with one of them. The servo-mechanism comprises a motor, shown diagrammatically at 57, for turning a shaft 58 to displace an object (not shown) through a distance proportional to the displacement of a controlling object, shown as a manual control knob 9. The control knob 9 turns the wiper arm 9' of a potentiometer over the winding 10 of the potentiometer. This winding is connected across D. C. supply lines 12 and 12', which, in the case of the particular system described—one for use on an aircraft—is energised from the aircraft's 27 volt battery. The wiper arm 9' is connected through a resistor 11 of high resistance, e. g. 1 MΩ to the terminal P of a pair of input terminals P, Q, for the mixer amplifier F and thence to the grid of a valve 14 in the mixer amplifier. A potential divider 13 is connected across the supply lines 12, 12', and its centre point is earthed or grounded. As a result, when the knob 9 is turned, a potential relative to earth is developed on arm 9' measuring the displacement of this arm from the central point of the potentiometer; this is applied to alter the potential of the grid of valve 14 relative to earth.

The valve 14 and another valve 15 in the mixer amplifier are connected as a "long-tailed pair," the anodes being connected through resistors 16, 17 of high resistance (about .5 MΩ) to the positive terminal of a source 18 of D. C. potential whose negative terminal is earthed, while the two cathodes are connected together and both are connected through a resistor 19 of high resistance (about .25 MΩ) to the negative terminal of a source 20 of D. C. potential whose positive terminal is earthed. A pair of resistors 21, 22 are connected in series between the anode of valve 15 and the negative terminal of source 20, and their junction 23 is used as the output terminal R of the mixer amplifier F, to provide an output potential relative to earth. The second input terminal Q is connected to the grid of valve 15.

It is well known that a "long-tailed pair," such as the pair of valves 14 and 15 of amplifier F, having a common cathode resistor, is a convenient form of signal mixer (in the sense of a true subtractive signal mixer, not in the sense of a multiplier or intermodulator) for signals applied from two sources to the grids of the two valves of the pair. It follows that the amplifier F may be regarded as a mixer amplifier or combining circuit for differentially opposing input voltages applied to the terminals P and Q.

The output from the mixer amplifier F is applied as an input to the main-channel power amplifier A, which comprises two parts $A_1$ and $A_2$ operating in cascade. The part $A_1$ is a valve amplifier, and the part $A_2$ is the motor 57, which may be considered to be an electromechanical power amplifier. The amplifier $A_1$ has its earlier stages arranged as a standard D. C. amplifier and its final stage arranged as a balanced modulator energised from an A. C. source 24, which, in the specific example described, provides 60 volts at 400 cycles per second. The amplifier $A_1$, therefore furnishes an A. C. output from its output terminals $T_1$, $T_2$ variable in amplitude and phase sense with the amplitude and polarity of the input voltage applied to it. Such D. C. amplifiers and balanced modulators are well known.

The motor 57 (or $A_2$) is a two-phase induction motor of a design having low rotor inertia. One of its phase windings 25—the fixed-phase winding—is permanently energised during operation of the system from the source 24; the other phase-winding 26—the controlled phase—is supplied from the output terminals $T_1$, $T_2$ of the valve amplifier $A_1$.

The amplifier $A_1$ delivers a variable amount of the power it receives from source 24 to its output terminal $T_1$, $T_2$ under the control of the input signal applied to the amplifier from terminal R, and the motor $A_2$ delivers an increased amount of mechanical power to shaft 58 to rotate this in one direction or the other according to the polarity with respect to earth of the input voltage to amplifier $A_1$. The rotation of shaft 58 effected by motor 57 may be regarded as the output of the power amplifier A.

Negative feed-back is provided by means of a nut 27 in engagement with the screw thread 28 on shaft 58. This nut moves a wiper arm 29 over a potentiometer winding 30 connected across the D. C. supply lines 12, 12′, displacing it in the sense electrically opposite to that in which the wiper arm 9′ was previously moved on potentiometer winding 10. This wiper arm 29 is connected to the input terminal P of the mixer amplifier F, through a resistor 3′ of high resistance, e. g. 1 MΩ.

The resistors 3′ and 11 interconnecting the wiper arms 29 and 9′ form a potential divider, and terminal P, by being connected to the junction of the two resistors, is caused to receive a potential that is a function both of the primary signal voltage provided by wiper arm 9′ and of the feed-back signal voltage provided by wiper arm 29. The potential divider, in effect, constitutes a mixing or combining circuit for adding the primary signal voltage from potentiometer 10 and the negative feed-back voltage from potentiometer 30 to make terminal P responsive to both. If it be assumed that the current taken by amplifier F from terminal P is zero, it will be evident that the potential of P is intermediate between that of wiper arm 29 and wiper arm 9′ in accordance with the ratio of the resistances of resistors 3′ and 11 considered as a pair forming a potential divider, so that the potential divider may be considered as mixing or combining the primary signal and the feed-back voltage in a ratio defined by the ratio of the resistances of the potential divider.

On the assumption that the amplifier $A_1$ has such a high amplification factor that the motor 57 will rotate even for a very low value of the potential of terminal P with respect to earth, it is evident that any rotation of motor 57 initiated by a change of the potential of input terminal P brought about by actuation of knob 9 will cease when wiper arm 29 moves over potentiometer winding 30 to a sufficient distance to reduce the potential of terminal P substantially to zero. This occurs when the ratio of the potential of wiper arm 29 to that of wiper arm 9′ is substantially the same as the ratio of the resistance of resistor 3′ to that of resistor 11. The overall amplification, or transmission ratio of the system is thus substantially determined by this feed-back ratio, and is substantially independent of the amplification factor of the amplifier $A_1$, always provided that this amplification factor is large.

In effect the system operates to keep the feed-back voltage provided by potentiometer 30 matched to the primary signal in the ratio of the resistances of the potential divider 3′, 11. The voltage input to terminal P is zero when correct matching is obtained; when correct matching is not obtained the potential at P is not zero. It is appropriate therefore to refer to the potential at P relative to earh as the error signal; it may equally well be considered to be a measure of the error of the system in keeping the rotation of shaft 8 matched to the rotation of knob 9, i. e. in keeping the output of the system matched to the input.

In accordance with the invention the error signal is also applied to an auxiliary drift-free compensating amplifier E. In the form of the invention illustrated this amplifier is a D.-C. amplifier that is made operative only at a succession of periods of time and is made self-compensating in the intervening periods in a manner that is known per se, the recurrent changeover from the operating to the self-compensating condition and vice versa being effected by a continuously operating switching device.

As shown, the switching device comprises a pair of commutator switches $S_1$, $S_2$ consisting of pairs of oppositely disposed commutator segments 32*a*, 32*b*; 33*a*, 33*b*; and 34*a*, 34*b* on switch $S_1$, and 35*a*, 35*b*; 36*a*, 36*b*; and 37*a*, 37*b*, on switch $S_2$. Rotary connecting arms 38 and 39 serve to connect opposite pairs of commutator segments together in switch $S_1$ and switch $S_2$ respectively. These arms are mounted on a common shaft 40′ which is continuously rotated when the system is in use.

The amplifier E is generally similar to amplifier F, and, like it, comprises two amplifying valves arranged as a "long-tailed" pair. Its input terminal P″, which is connected internally to the grid of one of the valves, is connected externally to commutator segment 35*a* of switch $S_2$, and is also connected through a capacitor 40, to segments 32*b*, 33*b* and 34*b* of switch $S_1$. The other input terminal Q″ of amplifier E, which is connected internally to the grid of the second valve of the "long-tailed" pair, is connected externally to earth. The output of the amplifier is developed between the live output terminal R′ on the one hand and earth, or Q″ on the other hand. Since terminal R′ is connected through resistor 21″ to the anode of the left hand valve or electron tube, the output is developed between terminal R′ and ground and is of opposite sense to the input which is applied between terminal P″ and ground. R′ is connected to segments 35*b*, 36*b*, and 37*b* of switch $S_2$.

It is evident that, as the switch arms 38 and 39 rotate, the input terminal P″ is connected, through capacitor 40, in succession to segments 32*a*, 33*a*, and 34*a*, while simultaneously the output terminal R′ is connected in succession to commutator segments 35*a*, 36*a*, and 37*a*. Segment 32*a* is connected to earth; while segment 33*a* is connected through a resistor 41 of high resistance (e. g. 1 MΩ) to the input terminal P of amplifier F, while segment 34*a* is connected through a similar resistor 41 to the input terminal P′ of a mixer amplifier F′ of a second servo-mechanism similar to that in which amplifiers F and A are included.

As has already been stated, segment 35*a* of switch $S_2$ is connected to the input terminal P″ of amplifier E. Segment 36*a* is connected through a filter circuit 42 to the second input terminal Q of amplifier F, and segment 37*a* is connected through a similar filter circuit 42′ to the second input terminal Q′ of amplifier F′ of the second servo-mechanism.

In the switch position shown in Fig. 3 for switches $S_1$ and $S_2$ the output terminal R′ is connected to the input terminal P″, and the capacitor 40 is connected between the input terminals P″ and Q″ of the amplifier E. The input and output terminals P″ and R′ are also completely disconnected from the mixer amplifiers F and F′. In this position the amplifier E receives no input signals, and it is connected to self degenerate any drift voltages originating inside itself, by developing on the input terminal P″ a correcting voltage required to compensate drift effects and reduce the output from terminal R′ to a substantially zero value (i. e. to a value negligible compared to output signal voltages from this amplifier, when the amplifier is amplifying signal voltages). The capacitor 40 becomes charged with this correcting or compensating voltage developed on terminal P″.

In the next position of the switches $S_1$ and $S_2$ reached on rotation of the arms 38, 39, the output terminal R′ of amplifier E is disconnected from the input terminal P″ and is connected via segment 36*b*, contact arm 39, and segment 36*a*, to filter 42 and thence to the second input terminal Q of the mixer amplifier F. One terminal of capacitor 40 remains connected to the input terminal P″ of amplifier E, but its other terminal is disconnected from earth, and is connected via contact segment 33*b*, contact arm 38, and segment 33*a* of switch $S_1$ to resistor 41 and, through the latter, to input terminal P of amplifier F. Thus this capacitor, instead of being connected in shunt across the input terminal P″ and Q″ of amplifier E, is connected in series with the input to terminal P″ from terminal P of amplifier F.

It follows that, in this position of the switch, the error signal that is applied to terminal P of amplifier F is also applied to terminal P″ of amplifier E, but through capacitor 40, which adds to this error signal the voltage stored on the capacitor to apply the sum of the two as an input to terminal P″. The voltage thus added by capacitor 40 is of the correct value to compensate for drift effects in amplifier E, so that the output from terminal R′ is an amplified version of the error signal developed on terminal P of amplifier F, free from any errors due to drift effects originating in amplifier E. This amplified error signal is of opposite sense to the error voltage developed on terminals P and is applied to the second input terminal Q of amplifier F, where its effect is additive to that of the error signal applied directly at P. The output from terminal R is therefore much greater, for the same error-signal input, than if amplifier E were not operating.

It follows that in the position of rest the error signal will be smaller than if amplifier E were not included in the system. In particular, errors due to drift effects occurring in the amplifier A will be smaller because they will be self-degenerated to a greater extent owing to the greater gain round the amplifying and feed-back loop when amplifier E is operating. In fact, to a close approximation, the error due to drift in the amplifier A is reduced, by use of amplifier E, by a factor equal to the amplification factor of amplifier E. To a close approximation also, amplifier E applies to amplifier A substantially the whole of the input to it that maintains the drift voltage output at its low value.

The filter 42 in Fig. 3 consists of a two-stage low-pass resistance-capacity filter which acts to smooth the signal fluctuations originating from the compensating amplifier E and its associated switches, so that only a smoothed signal is passed to input terminal Q of amplifier F. The time constant of this filter when connected to amplifier E should be long compared with time constants or natural periods of the main-channel amplifier A, in which case there is no tendency to make the system unstable at its natural frequencies owing to the increased amplification round the amplifying and feed-back loop obtained by the use of amplifier E.

The filter 42 has a special function in the case of an intermittently operating compensating amplifier, such as that shown in Fig. 3 in which the amplifier E is operative in the system only when the switches $S_1$ and $S_2$ are in one of their three switching positions, and is disconnected from the system in the intervening periods. In the intervals in which the amplifier is operative, the amplified version of the error signal that the amplifier E applies to terminal Q of the mixing amplifier F is applied through the filter 42, and the shunt capacitors in this filter become charged to a voltage equal to this version of the error signal. In the intervening periods the filter 42, though it remains connected to the input Q of amplifier F, is disconnected from all external circuits, and its capacitors have no discharge path except leakage. The time constant of the filter circuit is therefore extremely large during these periods. The capacitors therefore hold their charge substantially unchanged until the compensating amplifier E is connected back again into circuit. The potential difference to which they are charged is applied between earth and the input terminal Q of the mixing amplifier F, which thus receives the same full drift-compensating voltage required to compensate the servosystem against errors due to drift effects as is applied when the amplifier E is operative in the system. Thus the system is compensated for drift continuously, although the compensating amplifier E is only intermittently in operation in the system.

An important feature of the invention is that the switching cycle of the switches $S_1$, $S_2$ does not interfere with the overall operation of the system. This is due to the fact that, even when the compensating amplifier E is not included in the amplifying channel, i. e., even when the switches are not in the position that interconnects the segments 33*a*, 33*b*, on the one hand and 36*a*, 36*b*, on the other hand, there is nevertheless an amplifying channel in operation for the error signal, namely the direct channel through the input terminal P of the mixer amplifier F (corresponding to the channel 8 in Fig. 2, by which the error signal is fed forward past the compensating amplifier E), and to the fact that the overall performance of the system in response to a primary signal input is substantially the same whether the additional channel provided by the compensating amplifier is in operation or not. This last result depends on the fact that, provided that drift errors are removed by the application of the correct compensating voltage, the overall performance, as measured by the ratio of output of the system to primary signal input, is determined substantially solely by the feedback ratio, and is therefore substantially the same whether the error signal is amplified only by amplifier A or by amplifiers E and A in cascade, provided only that the amplification factor of amplifier A is high.

The commutator switches $S_1$ and $S_2$ are so designed that each of the contact arms 38 and 39, in passing from one segment to another, momentarily makes contact with the two segments. It is for this reason that the resistor 41 is employed, since without it the error-signal input to amplifier F would be momentarily short-circuited to earth twice in every revolution of the contact arm 38. The contact arms may be rotated at about 4 or 5 revolutions per second.

It may be seen in Fig. 3 that in the third position of the switches $S_1$ and $S_2$ the contact arms 38, 39 interconnect the pair of commutator segments 34*a*, 34*b*, and also interconnect the pair of segments 37*a*, 37*b*. In this position, therefore, the compensating amplifier is connected to receive as an input the error signal of the second servo-mechanism developed on terminal P′ of amplifier F′, and to apply an amplified version of this error voltage as an input to terminal Q′ of mixer amplifier F′, whereby it serves to reduce the effects of drift in the main-channel amplifier A′.

Thus the compensating amplifier E serves to compensate both servo-mechanisms for drift errors arising in the main-channel amplifiers of the systems by alternately operating in each of the two systems and by applying appropriate drift-compensating voltage in each system to a voltage-storing capacitor in that system, which continues to apply the compensating voltage in the intervals in which the compensating amplifier is not connected into that system.

The operation of the amplifier F in Figure 3 may be considered from another point of view, according to which it is not regarded as a mixing amplifier but as a straight amplifier, or, in effect, as the preliminary stage of amplifier $A_1$. According to this point of view, which is one frequently adopted for explaining the operation of a "long-tailed pair," the input to the amplifier is considered as being applied between the grids of the two valves 14 and 15, rather than between the grid of valve 14 and its cathode through the resistor 19. From this point of view there is only one input to amplifier F and this is applied between terminals P and Q. The input circuit to the amplifier must then be considered as the circuit from P through potentiometer winding 10 and supply lines 12, 12′ to earth, returning from earth to terminal Q by one or both of two paths, one being the path from terminal Q″ of amplifier E, through the output circuit of amplifier E to terminal R′, and thence through the series resistors of filter 42, and the other being the path through the shunt capacitors of filter 42. In either case the path includes the compensating voltage provided by amplifier E, or the compensating voltage stored on the capacitors of filter 42. It is equally true from this point of view that the output of amplifier E, which is an amplified version of the error signal, is added to the error signal, so that it is the sum of these that is amplified by amplifier A. From the present point of view, however, the mixing circuit is not the amplifier F but the input circuit to this amplifier connected between input terminals P and Q, in which the error signal and the output of amplifier E are connected in series.

Fig. 4 illustrates an embodiment of the invention applied to a negative-feed-back vacuum-tube amplifier. A primary D. C. signal variable in magnitude, and possibly in polarity, relatively to earth is applied from a source 10 through a resistor 11 of high resistance (1 MΩ) to the input terminal $P_1$ of a D. C. mixer amplifier F, whose output is applied to an amplifier A. The mixer amplifier is of the kind comprising a "long-tailed" pair similar to that shown in Fig. 3. The amplifier A is a D. C. amplifier of standard type. One of its output terminals $R_2$ is connected to earth, and the other, $R_1$, is connected through a high resistance 31 (100 MΩ) to the input terminal $P_1$ of the mixer amplifier F. The amplifier is one having a negative amplification factor, i. e., one in which a positive change of potential at $P_1$ produces a negative change at $R_1$. The connection of $R_1$ through resistor 31 to $P_1$ thus provides negative feed-back whereby the amplifier operates to make its output proportional to the primary signal input in the feed-back ratio determined by the ratio of resistors 31 to 11, i. e. in the case illustrated, in the ratio of 100:1. The output voltage may be applied to any load, for instance to a recorder for recording changes in the primary voltage input.

In all other respects the system is similar to that of Fig. 3, except that the amplifier receives power from a D. C. source instead of from an A. C. source, and that the filter circuit 42 comprises only a single-stage resistance capacity filter. Drift compensation is therefore obtained in the same manner as in Fig. 3. The system therefore provides a continuously operating D. C. amplifier or amplifiers free from errors due to drift voltages.

It will be appreciated that the invention may take a variety of forms other than those illustrated in Figs. 3 and 4. In particular the compensating amplifier need not be one in which every stage of the amplifier is a D. C. amplifier. For example, the compensating amplifier may comprise a "chopper" for interrupting the input signal, an amplifier for amplifying the pulsating signals so obtained, and a phase-detecting rectifier of known type that will provide a D. C. output from the amplified pulsating signals varying in magnitude and polarity with the magnitude and polarity of the input voltage to the compensating amplifier.

The drift compensating system of the present invention depends fundamentally for its operation on the fact that in a negative feed back D. C. amplifier, drift effects are automatically reduced by the negative feed back. The higher the gain around the loop, the more drift effects are degenerated. However, drift effects cannot be eliminated simply by increasing the gain around the loop since increasing it beyond a certain point introduces instability and the amplifier tends to oscillate at some particular frequency. Moreover, an ordinary high gain D. C. amplifier is liable to drift to a greater extent than an amplifier of lower gain.

One method of overcoming the harmful effects produced by increasing the gain of an amplifier as mentioned in the preceding paragraph is to make the first stage or stages of the amplifier drift free and by preventing the amplifier from responding to those frequency components at which it is liable to oscillate. However, this method has primarily two drawbacks, one being the difficulty of producing a continuously operating drift free amplifier and the other being that the system is usually required to respond to frequencies at which the amplifier is liable to oscillate.

The present invention overcomes all of the difficulties referred to in the last paragraph in that a path is provided for the signals around the drift free amplifier and with this arrangement the drift free amplifier may be one that operates intermittently and also the signal path may be made to respond substantially only to desired frequencies. For example, in the arrangement shown diagrammatically in Figure 2, the control signals are fed from the combining device C through the by-pass 8 to the amplifier A. Drift voltages also pass along this by-pass to the amplifier A, but in addition thereto, an amplified version reaches the amplifier A through the drift free amplifier E. Hence, the effective gain through the amplifier E is considerably greater than that through the signal by-pass. The system is prevented from oscillating by restricting the frequency range of amplifier E. Since drift effects are normally of very low frequency, this frequency restriction does not affect the efficiency of the system in reducing drift effects.

Further, in connection with the embodiment of our invention shown in Figure 3, it will be noted that the signal supplied from the combining device F to the amplifier $A_1$ is effectively the sum of the error signal and an amplified version of the error signal. As the amplifier $A_1$ and the feed back circuit operate to reduce the error signal toward zero, any error signal other than a drift error signal will last only long enough for the system to operate to reduce to zero, that is, its duration will be equal to the time constant of the system as a whole. The time constant of the smoothing circuit 42 is very long compared with the time constant of the system and consequently error signals supplied from the amplifier E will have very little effect on the voltage applied at terminal Q of the device F. In other words, as far as the normal operation of the system is concerned, the drift free amplifier E is ineffective. When drift errors occur in the main amplifier $A_1$, the steady drift signal will appear at terminal P in addition to any error signal that may be present. This steady signal is amplified by the amplifier E and an amplified version of each is fed to input terminal Q. Thus, the input to the main amplifier $A_1$ includes the low level version of the drift signal fed through terminal P and the amplified version of the drift signal fed through terminal Q, these two signals being added in the input of the combining device F. The drift free amplifier E may be considered to be located in the feed back path from the output of amplifier $A_1$ to its input solely for drift signals, and therefore to degenerate these signals approximately in accordance with its gain.

Furthermore the amplifier E may be connected to receive the error signal indirectly instead of directly. For example, the input may be derived from the output terminal R of amplifier F instead of from the input terminal P, in which case, however, the amplifier E must have an amplification factor less than unity, since it is connected to regenerate its own input.

We claim:

1. A signal amplification system comprising a signal generating means for providing a system input signal, a first D. C. amplifier, a load device connected to said first D. C. amplifier and responsive to the output thereof for providing a system response signal, means for differentially combining said system input signal and said system response signal so as to produce a difference signal, a capacitor, a second D. C. amplifier, switching means operable in a first sense to connect the difference signal output of said combining means in series with said capacitor to the input of said second D. C. amplifier while simultaneously connecting the output of said second D. C. amplifier to the input of said first D. C. amplifier, said switching means being operable in a second sense to disconnect the connections provided by its first sense of operation and simultaneously to connect the output of said second D. C. amplifier across said capacitor and to the input of said second D. C. amplifier, means for operating said switching means so that the latter is operated at successively recurrent time intervals respectively in its first and second senses, and means coupled to said combining means and said first D. C. amplifier for providing a path for said difference signal to said first D. C. amplifier that by-passes the circuitry of said switching means, said capacitor and said second D. C. amplifier.

2. A signal amplification system comprising a signal generating means for providing a system input signal, a first D. C. amplifier, a load device connected to said first D. C. amplifier and responsive to the output thereof for providing a system response signal, signal subtracting means for differentially combining said system input signal and said system response signal so as to produce a difference signal, signal adding means having first and second input circuits, a capacitor, a second D. C. amplifier, switching means operable in a first sense to connect the difference signal output of said signal subtracting means in series with said capacitor to the input of said second D. C. amplifier while simultaneously connecting the output of said second D. C. amplifier to one of the input circuits of said signal adding means, said switching means being operable in a second sense to disconnect the connections provided by its first sense of operation and simultaneously to connect the output of said second D. C. amplifier across said capacitor and to the input of said second D. C. amplifier, means for operating said switching means so that the latter is operated at successively recurrent time intervals respectively in its first and second senses, means connecting the output of said subtracting means to the other input circuit of said signal adding means whereby to provide a path for said difference signal that by-passes the circuitry of said switching means, said capacitor and said second D. C. amplifier, and coupling means for supplying the signal output of said signal adding means to the input of said first D. C. amplifier.

3. The system set forth in claim 2, wherein the coupling means for supplying the signal output of the signal adding means to the input of the first D. C. amplifier includes signal smoothing means having a time constant equivalent in duration at least to the respective time intervals during which the switching means is operated in its second sense.

4. The system set forth in claim 2, wherein the load device comprises a servomotor and an additional signal generating means connected to be driven by said servomotor for providing the system response signal.

References Cited in the file of this patent

UNITED STATES PATENTS

| | | |
|---|---|---|
| 1,743,252 | Tanner | Jan. 14, 1930 |
| 2,190,743 | Vance | Feb. 20, 1940 |
| 2,347,015 | Woloschak | Apr. 18, 1944 |
| 2,351,079 | Strobel | June 13, 1944 |
| 2,356,567 | Cockrell | Aug. 22, 1944 |
| 2,419,812 | Bedford | Apr. 29, 1947 |
| 2,475,576 | Wild et al. | July 5, 1949 |
| 2,481,485 | Stanton | Sept. 13, 1949 |
| 2,488,448 | Townes et al. | Nov. 15, 1949 |
| 2,492,542 | Stone | Dec. 27, 1949 |

FOREIGN PATENTS

| | | |
|---|---|---|
| 620,140 | Great Britain | Mar. 21, 1949 |